US008917328B2

(12) United States Patent
Nishimura et al.

(10) Patent No.: US 8,917,328 B2
(45) Date of Patent: Dec. 23, 2014

(54) IMAGE PROCESSING APPARATUS AND IMAGE PROCESSING METHOD

(75) Inventors: Yoshihiko Nishimura, Tokyo (JP); Shuji Okegawa, Chiba (JP)

(73) Assignee: Sony Corporation, Tokyo (JP)

( * ) Notice: Subject to any disclaimer, the term of this patent is extended or adjusted under 35 U.S.C. 154(b) by 335 days.

(21) Appl. No.: 13/176,904

(22) Filed: Jul. 6, 2011

(65) Prior Publication Data

US 2012/0050558 A1 Mar. 1, 2012

(30) Foreign Application Priority Data

Aug. 31, 2010 (JP) ................................. 2010-194107

(51) Int. Cl.
*H04N 5/228* (2006.01)
*H04B 1/38* (2006.01)
*H04N 5/232* (2006.01)
*G06F 1/16* (2006.01)

(52) U.S. Cl.
CPC .............. *H04N 5/232* (2013.01); *G06F 1/1626* (2013.01); *H04N 5/23293* (2013.01)
USPC ...................... 348/222.1; 455/566

(58) Field of Classification Search
CPC ................................................... H04M 1/0233
USPC ..................... 348/333.12; 455/566
See application file for complete search history.

(56) References Cited

U.S. PATENT DOCUMENTS

| 2001/0048463 | A1* | 12/2001 | Lunden ...................... 348/14.02 |
| 2002/0131060 | A1* | 9/2002 | Maier et al. .................... 358/1.2 |
| 2003/0133017 | A1* | 7/2003 | Mauro ..................... 348/207.99 |
| 2005/0137001 | A1* | 6/2005 | Bell et al. ................... 455/575.4 |
| 2006/0240873 | A1* | 10/2006 | You et al. ....................... 455/566 |
| 2008/0316361 | A1* | 12/2008 | Ito et al. ........................ 348/572 |

FOREIGN PATENT DOCUMENTS

JP 2009-3240 1/2009

* cited by examiner

*Primary Examiner* — Joel Fosselman
(74) *Attorney, Agent, or Firm* — Oblon, Spivak, McClelland, Maier & Neustadt, L.L.P.

(57) ABSTRACT

An image processing apparatus includes: a casing; a posture detection unit detecting whether a posture of the casing is a vertical posture; an imaging unit capturing an image of a subject and outputting the captured image; an image transform unit transforming the captured image into a horizontally and vertically transformed image with the same size as that of the captured image by rotating the captured image so as to reverse its horizontal and vertical sides and further reducing the captured image; a recording reproduction unit recording image data generated from the captured image; and a control unit controlling the image transform unit and the recording reproduction unit to generate the image data from the horizontally and vertically transformed image instead of the captured image, when the posture of the casing is the vertical posture.

10 Claims, 10 Drawing Sheets

FIG. 7
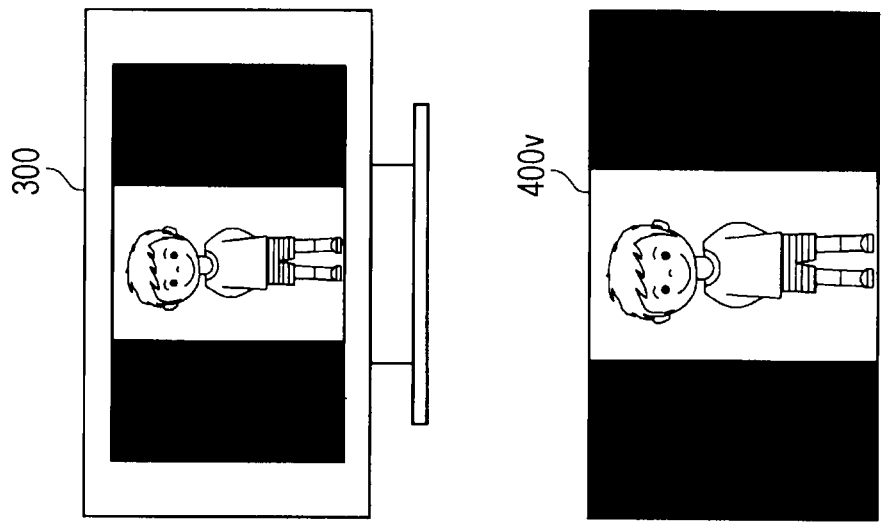
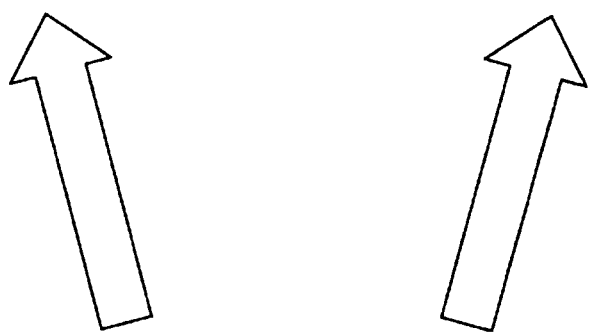
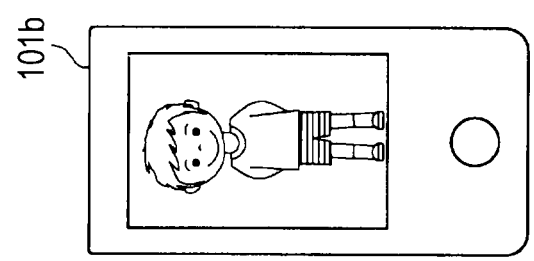

FIG. 8
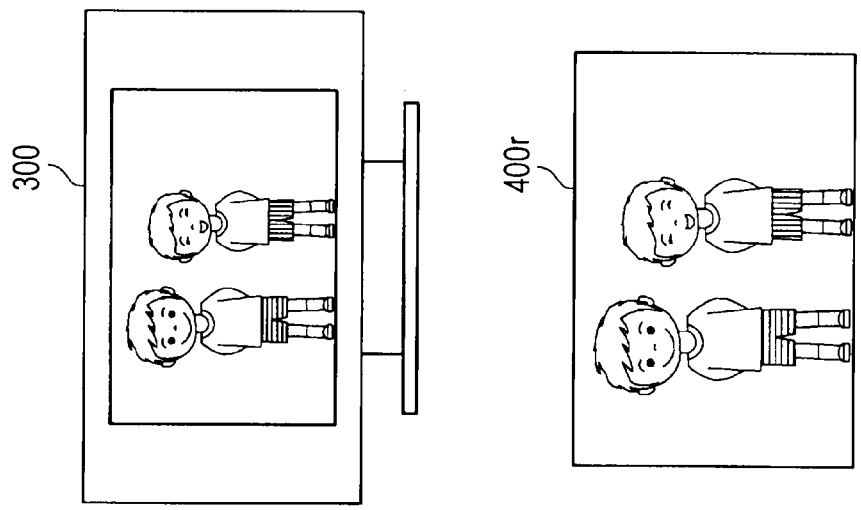
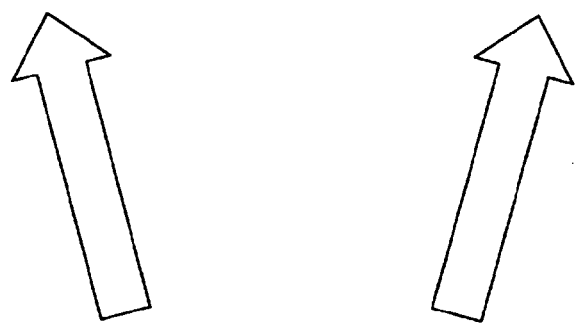
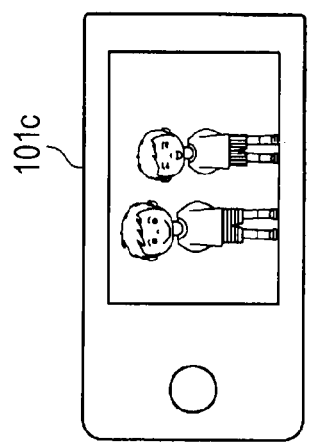

FIG. 10
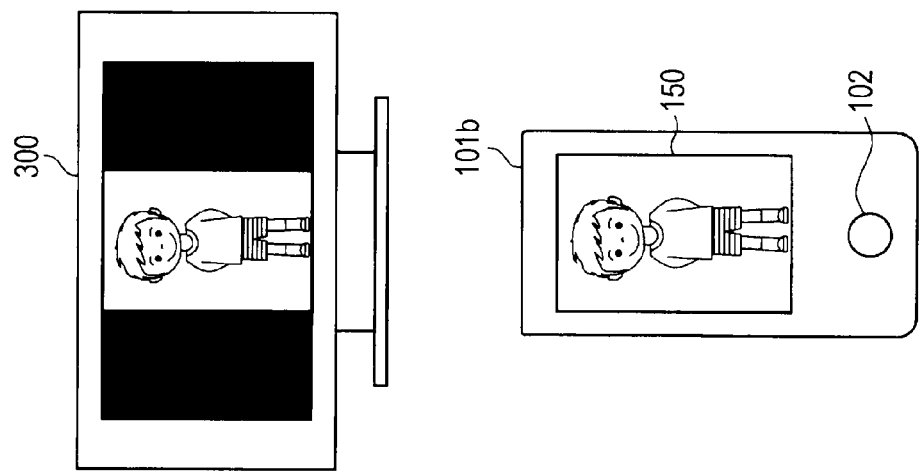
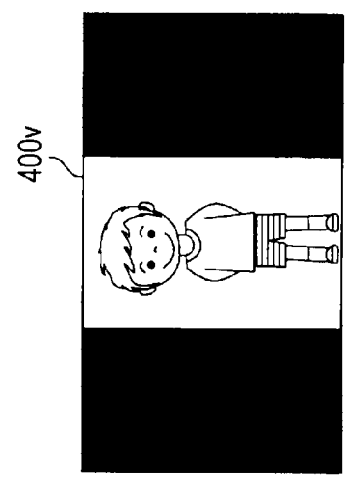

IMAGE PROCESSING APPARATUS AND IMAGE PROCESSING METHOD

BACKGROUND

The present disclosure relates to an image processing apparatus and an image processing method.

In general, a still image or a moving image is captured using an apparatus such as a camera or a video camera. An image signal obtained by capturing the still image or the moving image is recorded as image data in accordance with predetermined formats. Here, in many formats used to record the image data, an aspect ratio of the screen for defining the horizontal-to-vertical ratio of an image is determined. For example, in a case of a moving image, a horizontal-to-vertical ratio of 16:9, a horizontal-to-vertical ratio of 4:3, or the like is generally used as the aspect ratio of the screen. In recent years, techniques for processing these aspect ratios of the screen have been developed. For example, Japanese Unexamined Patent Application Publication No. 2009-3240 discloses a technique for determining plural kinds of aspect ratios of the screen and outputting an image at an optimum aspect ratio.

SUMMARY

At the imaging time, the posture of an apparatus may be varied. For example, when the apparatus falls horizontally, the apparatus sometimes executes imaging. Alternatively, when the upper and lower sides of the apparatus are reversed with respect to each other, the apparatus sometimes executes imaging. In this case, as for the image data, an image which falls horizontally is recorded or an image of which the upper and lower sides of the image are reversed with respect to one another is recorded. When such image data is reproduced, a problem may arise in that the image which is reversed horizontally or of which the upper and lower sides are reversed with respect to one another is recorded. According to the technique disclosed in Japanese Unexamined Patent Application Publication No. 2009-3240, the aspect ratio of the screen is optimized between images with the aspect ratios of the horizontally long screen. However, since the technique does not correct the direction of an image, this problem has not been resolved.

It is desirable to provide an image processing apparatus and an image processing method which are novel and improved and are capable of obtaining an image with a subject of a regular direction irrespective of the posture of an apparatus.

According to an embodiment of the disclosure, there is provided an image processing apparatus including: a casing; a posture detection unit detecting whether a posture of the casing is a vertical posture; an imaging unit capturing an image of a subject and outputting the captured image; an image transform unit transforming the captured image into a horizontally and vertically transformed image with the same size as that of the captured image by rotating the captured image so as to reverse its horizontal and vertical sides and further reducing the captured image; a recording reproduction unit recording image data generated from the captured image; and a control unit controlling the image transform unit and the recording reproduction unit to generate the image data from the horizontally and vertically transformed image instead of the captured image, when the posture of the casing is the vertical posture.

The image processing apparatus may further include a display unit displaying the captured image irrespective of the posture of the casing.

The image processing apparatus may further include a communication unit outputting the captured image to an external display apparatus. The control unit may control the image transform unit and the communication unit to output the horizontally and vertically transformed image instead of the captured image, when the posture of the casing is the vertical posture.

The image processing apparatus may further include a metadata processing unit adding metadata, which indicates whether an image included in the image data is the horizontally and vertically transformed image, to the image data.

The control unit may determine whether the posture of the casing is the vertical posture, when the recording reproduction unit starts recording the image data.

The posture detection unit may detect whether the posture of the casing is a reverse posture. The image transform unit may transform the captured image or the horizontally and vertically transformed image into a reversed image by rotating the captured image or the horizontally and vertically transformed image so as to reverse the upper and lower sides thereof. The control unit may control the image transform unit and the recording reproduction unit to generate the image data from the reversed image instead of the captured image or the horizontally and vertically transformed image, when the posture of the casing is the reverse posture.

The image processing apparatus may further include a display unit displaying a reproduced image. The recording reproduction unit may acquire the reproduced image from the image data. The metadata processing unit may acquire the metadata added to the image data. Based on the metadata, the image transform unit may transform the reproduced image into an expanded or reduced image by expanding or reducing the reproduced image so as to have a size corresponding to the size of the display unit. The control unit may control the image transform unit and the display unit to display the expanded or reduced image instead of the reproduced image, when the posture of the casing is the vertical posture.

According to another embodiment of the disclosure, there is provided an image processing apparatus including: a casing; a posture detection unit detecting whether a posture of the casing is a vertical posture; a recording reproduction unit acquiring a reproduced image from image data; a display unit displaying the reproduced image; a metadata processing unit acquiring metadata indicating whether an image added to the image data and included in the image data is a horizontally and vertically transformed image; an image transform unit transforming the reproduced image into an expanded or reduced image by expanding or reducing the reproduced image so as to have a size corresponding to the size of the display unit based on the metadata; and a control unit controlling the image transform unit and the display unit to display the expanded or reduced image instead of the reproduced image, when the posture of the casing is the vertical posture.

The image processing apparatus may further include a communication unit outputting the reproduced image to an external display apparatus irrespective of the posture of the casing.

The posture detection unit may detect whether the posture of the casing is a reverse posture. The image transform unit may transform the reproduced image or the expanded or reduced image into a reversed image by rotating the reproduced image or the expanded or reduced image so as to reverse the upper and lower sides thereof. The control unit may control the image transform unit and the display unit to display the reversed image instead of the reproduced image or the expanded or reduced image, when the posture of the casing is the reverse posture.

According to still another embodiment, there is provided an image processing method that includes: detecting whether a posture of a casing is a vertical posture; capturing an image of a subject and outputting the captured image; transforming the captured image into a horizontally and vertically transformed image with the same size as that of the captured image by rotating the captured image so as to reverse its horizontal and vertical sides and further reducing the captured image; and recording image data generated from the captured image. The image data may be generated from the horizontally and vertically transformed image instead of the captured image, when the posture of the casing is the vertical posture.

According to still another embodiment, there is provided an image processing method that includes: detecting whether a posture of a casing is a vertical posture; acquiring a reproduced image from image data; displaying the reproduced image on a display unit; acquiring metadata indicating whether an image added to the image data and included in the image data is a horizontally and vertically transformed image; and transforming the reproduced image into an expanded or reduced image by expanding or reducing the reproduced image so as to have a size corresponding to the size of the display unit based on the metadata. The expanded or reduced image may be displayed instead of the reproduced image, when the posture of the casing is the vertical posture.

As described above, according to the embodiments of the disclosure, it is possible to obtain an image with a subject of the regular direction irrespective of the posture of an apparatus.

BRIEF DESCRIPTION OF THE DRAWINGS

FIG. 7 is a diagram illustrating an image recorded or displayed by the image processing apparatus according to the first embodiment;

FIG. 8 is a diagram illustrating an image recorded or displayed by the image processing apparatus according to the first embodiment;

FIG. 10 is a diagram illustrating an image displayed by the image processing apparatus according to the first embodiment.

DETAILED DESCRIPTION OF EMBODIMENTS

Figure 1:
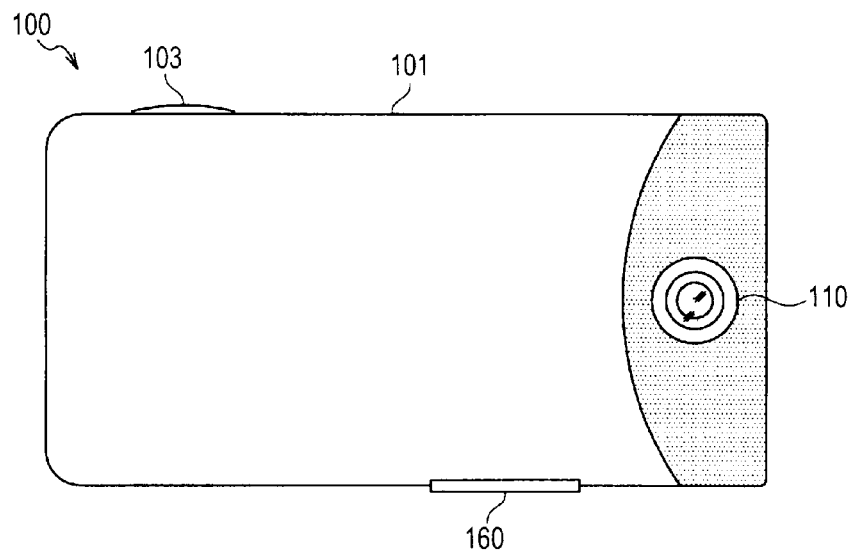
FIG. 1 is a front view illustrating the outer appearance configuration of an image processing apparatus according to a first embodiment of the disclosure.

Hereinafter, a preferred embodiment of the disclosure will be described in detail with reference to the accompanying drawings. The same reference numerals are given to constituent elements having substantially the same functions through the specification and the drawings, and the description thereof will not be repeated.

The description will be made in the following order.

Figure 2:
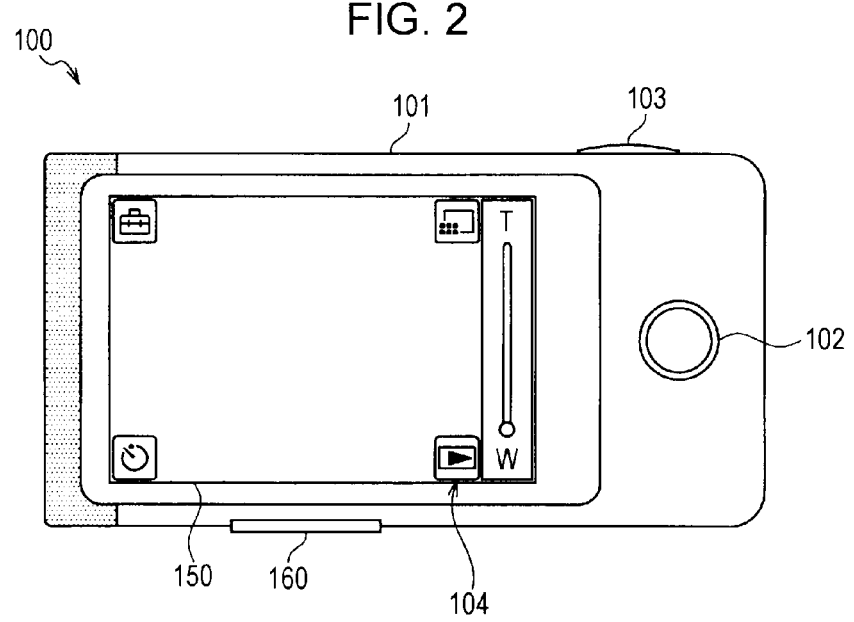
FIG. 2 is a rear view illustrating the outer appearance configuration of the image processing apparatus according to the first embodiment.
Figure 3:
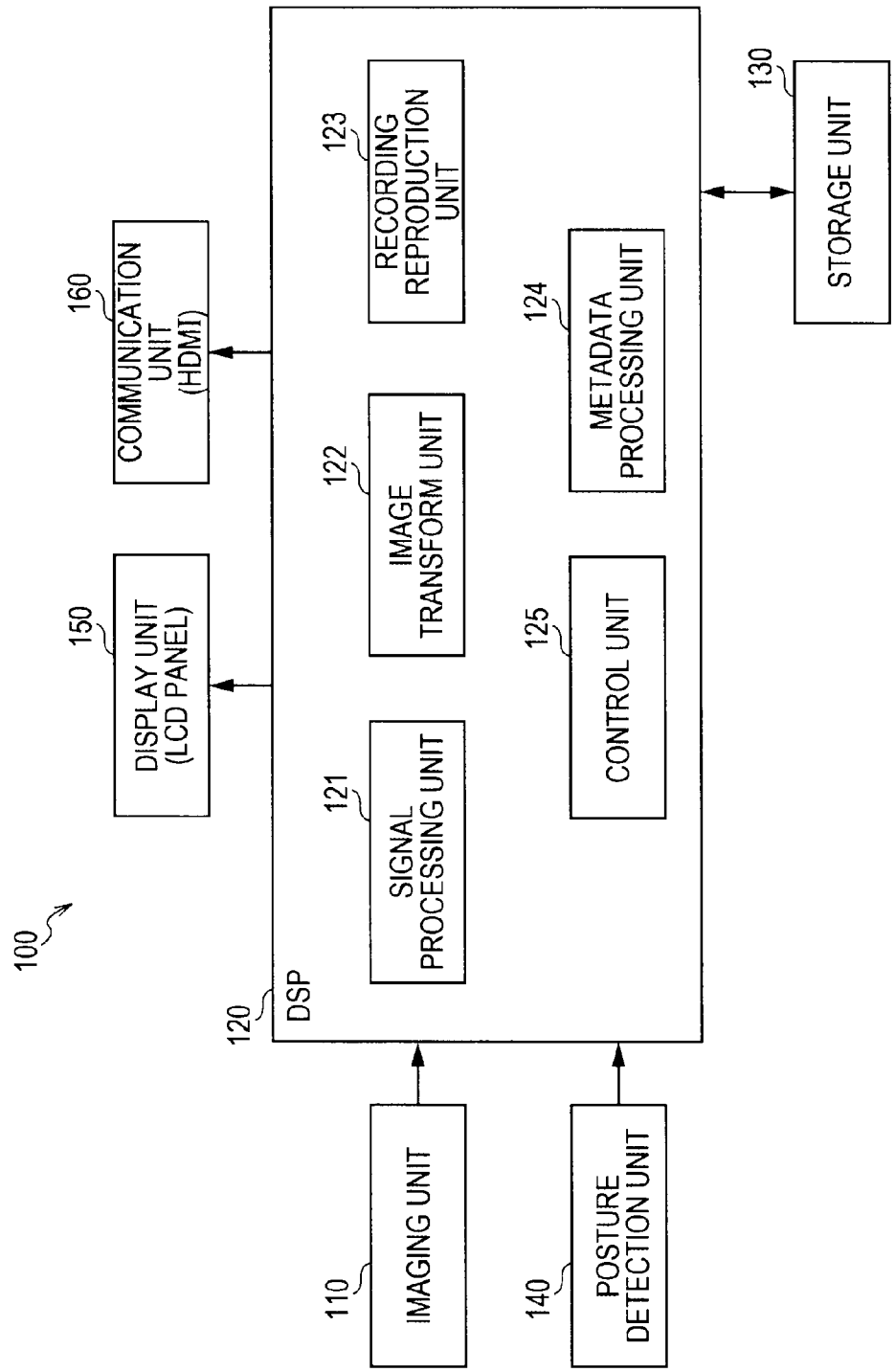
FIG. 3 is a block diagram illustrating the functional configuration of the image processing apparatus according to the first embodiment.

1. First Embodiment
1-1. Configuration of Image Processing Apparatus
1-2. Change in Posture of Casing
1-3. Process at the Imaging Time of Imaging Processing Apparatus
1-4. Process at the Reproducing Time of Imaging Processing Apparatus
2. Review 1. First Embodiment 1-1. Configuration of Image Processing Apparatus First, the configuration of an image processing apparatus according to a first embodiment of the disclosure will be described with reference to FIGS. 1 to 3. FIG. 1 is a front view illustrating the outer appearance configuration of an image processing apparatus 100 according to this embodiment. FIG. 2 is a rear view illustrating the outer appearance configuration of the image processing apparatus 100 according to this embodiment. FIG. 3 is a block diagram illustrating the functional configuration of the image processing apparatus 100 according to this embodiment. An image processing apparatus according to embodiments of the disclosure is realized as a digital camera such as the image processing apparatus 100 shown in FIGS. 1 to 3 and any electronic apparatus having an image processing function.

The image processing apparatus 100 is a digital camera (for example, a digital still camera or a digital video camera) that has a function of recording a still image or a moving image obtained by imaging a subject as digital image data in a storage medium. Further, the image processing apparatus 100 may have a function of reproducing the image data recorded in the storage medium as a still image or a moving image.

As shown in FIGS. 1 and 2, the image processing apparatus 100 includes a casing 101. In this embodiment, the shape of the casing 101 has a small-sized and horizontally long shape conveniently carried and imaged by a user. The casing 101 includes an imaging unit 110 that images a subject, a display unit 150 that displays a captured image or a reproduced image, and a communication unit 160 that outputs the captured image or the reproduced image to an external display apparatus. A control unit and a storage unit of the image processing apparatus 100 are installed inside the casing 101. The casing 101 further includes, as operation units receiving an input of the user to capture or reproduce an image, a record button 102 configured to start or end imaging and recording of a moving image, a release button 103 configured to capture and record a still image, and a touch panel 104 installed on the surface of the display unit 150. For example, the touch panel 104 detects touching of a user on an operating area displayed on the display unit 150 to acquire various operations of the user to capture and reproduce the image.

In the example shown in the drawings, the casing 101 is disposed to be horizontally long. When the casing 101 is viewed from its rear surface side, the display unit 150 is disposed on the left side and the record button 102 is disposed on the right side. Such a posture of the casing 101 is the primary posture. As described below, the image processing apparatus 100 is capable of capturing or reproducing an image even when the casing 101 is rotated in any direction.

Referring to FIG. 3, the imaging processing apparatus 100 includes the imaging unit 110, a DSP (Digital Signal Processor) 120, a storage unit 130, a posture detection unit 140, a display unit 150, and a communication unit 160. The DSP 120 functions as a signal processing unit 121, an image transform unit 122, a recording reproduction unit 123, a metadata processing unit 124, and a control unit 125.

The imaging unit 110 captures the image of a subject and outputs the captured image. For example, the image unit 110 includes an imaging optical system, an imaging element, a timing generator, and an optical component driving unit. Here, the imaging optical system includes various kinds of lenses such as a focus lens and a zoom lens, an optical filter removing an unnecessary wavelength, and an optical component such as a diaphragm. An optical image (subject image) incident from the subject is formed on the exposure surface of the imaging element via each optical component of the imaging optical system. The imaging element (image sensor) is configured by a solid imaging element such as a CCD (Charge Coupled Device) or a CMOS (Complementary Metal Oxide Semiconductor). The imaging element performs photoelectric conversion on the optical image guided from the imaging optical system and outputs an image signal (analog image signal) representing the captured image.

The DSP 120 is an arithmetic processing device that performs image processing of the captured image and controls the operation of the imaging processing apparatus 100. The signal processing unit 121 of the DSP 120 performs predetermined signal processing on the image signal representing the captured image output from the imaging unit 110 and outputs the image signal subjected to the signal processing. The signal processing unit 121 includes an analog signal processor, an analog/digital converter, and a digital signal processor. Here, the analog signal processor is a so-called analog front-end that performs preprocessing on the image signal. For example, the analog signal processor performs CDS (Correlated Double Sampling) processing, gain processing of PGA (Programmable Gain Amplifier), or the like on the image signal output from the imaging unit 110. The analog/digital converter converts the analog image signal input from the analog signal processor into a digital image signal and outputs the converted digital image signal to the digital signal processor. The digital signal processor performs digital signal processing, such as noise removal, white balance adjustment, color correction, edge reinforcement, or gamma correction, on the input digital image signal and outputs the image signal subjected to the digital signal processing. The signal processing unit 121 may not necessarily perform analog and digital signal processing. For example, the imaging unit 110 may output the digital image signal and the signal processing unit 121 may perform only the digital signal processing.

The image transform unit 122 of the DSP 120 processes the image signal output from the signal processing unit 121 or the recording reproduction unit 123 and further performs transforming, such as rotation, reduction, or expansion, on the image represented by the image signal. Thus, the image transform unit 122 transforms the captured image or the reproduced image into an image suitable for recording or display. For example, the image transform unit 122 may transform the captured image into an image, of which the width and height are reversed with respect to one another and which has the same size as that of the captured image, by rotating the captured image so as to reverse its width and height to each other and further reducing the captured image. The image transform unit 122 may also transform the reproduced image into an expanded or reduced image by expanding or reducing the reproduced image so as to have a size corresponding to the size of the display unit 150. The image transform unit 122 may also transform the captured image or the reproduced image into a reversed image by rotating the captured image or the reproduced image so as to reverse the upper and lower sides with respect to one another. Not only a horizontally and vertically reversed image, an expanded or reduced image, and a reversed image but also control of transforming such images by the control unit 125 will be described below.

The recording reproduction unit 123 of the DSP 120 generates the image data from the captured image and stores the generated image data in the storage unit 130. The recording reproduction unit 123 may use the horizontally and vertically transformed image transformed from the captured image by the image transform unit 122 or the reversed image instead of the captured image under the control of the control unit 125. The control of the recording production unit 123 by the control unit 125 will be described below. The recording reproduction unit 123 generates the image data by compressing the image signal output from the signal processing unit 121 or the image transform unit 122 in accordance with a predetermined format such as MPEG (Moving Picture Experts Group) 4, when the record button 102 is pressed down in, for example, a moving image capturing mode. The recording reproduction unit 123 may read the image data from the storage unit 130 and acquire the reproduced image from the image data. The recording reproduction unit 123 may decompress the image data in accordance with the predetermined format such as MPEG-4 and outputs the acquired reproduced image, when a user's operation of reproducing a moving image is acquired via, for example, the touch panel 104.

Here, an aspect ratio of the screen for defining the horizontal-to-vertical ratio of an image is determined in advance for the format used to generate the image data or acquire the reproduced image in the recording reproduction unit 123. The aspect ratio of the screen such as a horizontal-to-vertical ratio of 16:9 or a horizontal-to-vertical ratio of 4:3 is determined. Here, the aspect ratio of the screen determined in the above-mentioned format is assumed to be an aspect ratio of a horizontally long screen such as a horizontal-to-vertical ratio of 16:9. The specific values of the aspect ratio of the screen according to the embodiment of the disclosure are not important elements. For example, the aspect ratio of the screen determined in the format may be the aspect ratio of another horizontally long screen such as a horizontal-to-vertical ratio of 4:3. The aspect ratio of the screen determined in the format may be an aspect ratio of a vertically long screen.

The metadata processing unit 124 of the DSP 120 adds metadata to the image data generated by the recording reproduction unit 123. The metadata processing unit 124 may acquire metadata added to the image data read from the storage unit 130. For example, the metadata processing unit 124 adds and acquires the metadata as tag information included in the file of the image data. The metadata processing unit 124 may add metadata, which indicates whether an image included in the image data is a horizontally and vertically transformed image, to the image data according to the control of the control unit 125. The metadata processing unit 124 may acquire the metadata, which indicates whether an image included in the image data is a horizontally and vertically transformed image, from the image data and outputs the metadata to the control unit 125.

The control unit 125 of the DSP 120 is configured by an arithmetic processing device such as a micro-controller and controls the operation of each unit of the image processing apparatus 100. For example, the control unit 125 is operated in accordance with programs stored in a flash ROM (Read Only Memory) or the like included in the storage unit 130 to execute various kinds of arithmetic processing necessary for control. In the arithmetic processing, a DRAM (Dynamic Random Access Memory) included in the storage unit 130 may be used. The programs may be stored in a disk-shaped storage medium or a removable storage medium such as a memory card so as to be supplied to the image processing apparatus 100 or may be downloaded to the image processing apparatus 100 via a network such as LAN (Local Area Network) or the Internet. For example, when the posture of the casing 101 detected by the posture detection unit 140 is a vertical posture, the control unit 125 may control the image transform unit 122 and the recording reproduction unit 123 to generate the image data from the horizontally and vertically transformed image instead of the captured image. When the posture of the casing 101 is a reverse posture, the control unit 125 may control the image transform unit 122 and the recording reproduction unit 123 to generate the image data from a reversed image instead of the captured image or the horizontally and vertically transformed image. When the posture of the casing 101 is a vertical posture, the control unit 125 may control the image transform unit 122 and the display unit 150 to display an expanded or reduced image instead of the reproduced image. When the posture of the casing 101 is a reverse posture, the control unit 125 may control the image transform unit 122 and the display unit 150 to display a reversed image instead of the reproduced image or the expanded or reduced image. The operation of the control unit 125 based on the output of the posture detection unit 140 will be described below.

The storage unit 130 stores data regarding the process of the image processing apparatus 100. For example, the storage unit 130 may be a semiconductor memory such as a flash ROM or a DRAM, an optical disc such as a BD (Blu-ray Disc), a DVD (Digital Versatile Disc), or a CD (Compact Disc), or a hard disk. The storage unit 130 may be a storage device built into the image processing apparatus 100 or may be removable medium such as a memory card detachably mounted on the image processing apparatus 100. The storage unit 130 may include plural kinds of storage devices or removable media. The storage unit 130 may store not only the image data generated or read by the recording reproduction unit 123 but also the programs or the like that operates the control unit 125.

The posture detection unit 140 detects the posture of the casing 101 of the image processing apparatus 100 and outputs the detection result to the control unit 125. The posture detection unit 140 detects whether the posture of the casing 101 is a vertical posture based on the rotation of the casing 101 in tri-axial directions detected using, for example, an acceleration sensor, a magnetic sensor, or a gyroscope sensor. Further, the posture detection unit 140 may likewise detect whether the posture of the casing 101 is a reverse posture. The vertical posture and the reverse posture will be described in detail below.

The display unit 150 displays a captured image output from the imaging unit 110 or a reproduced image output from the recording reproduction unit 123. Examples of the display unit 150 include a LCD (Liquid Crystal Display) and an organic EL (Electro-Luminescence) display. The display unit 150 may display the captured image irrespective of the posture of the casing 101 at the imaging time. The display unit 150 may use an expanded or reduced image transformed from the reproduced image by the image transform unit 122 instead of the reproduced image under the control of the control unit 125 at the reproducing time. The control of the display unit 150 performed by the control unit 125 will be described below.

The communication unit 160 outputs the captured image output from the imaging unit 110 or the reproduced image output from the recording reproduction unit 123 to an external display apparatus. For example, the communication unit 160 includes an HDMI (High-Definition Multimedia Interface). The communication unit 160 may use a horizontally and vertically transformed image or a reversed image transformed from the captured image by the image transform unit 122 instead of the captured image under the control of the control unit 125 at the imaging time. The communication unit 160 may output the reproduced image irrespective of the posture of the casing 101 at the reproducing time. The control of the communication unit 160 performed by the control unit 125 will be described below.

1-2. Change in Posture of Casing

Figure 4:
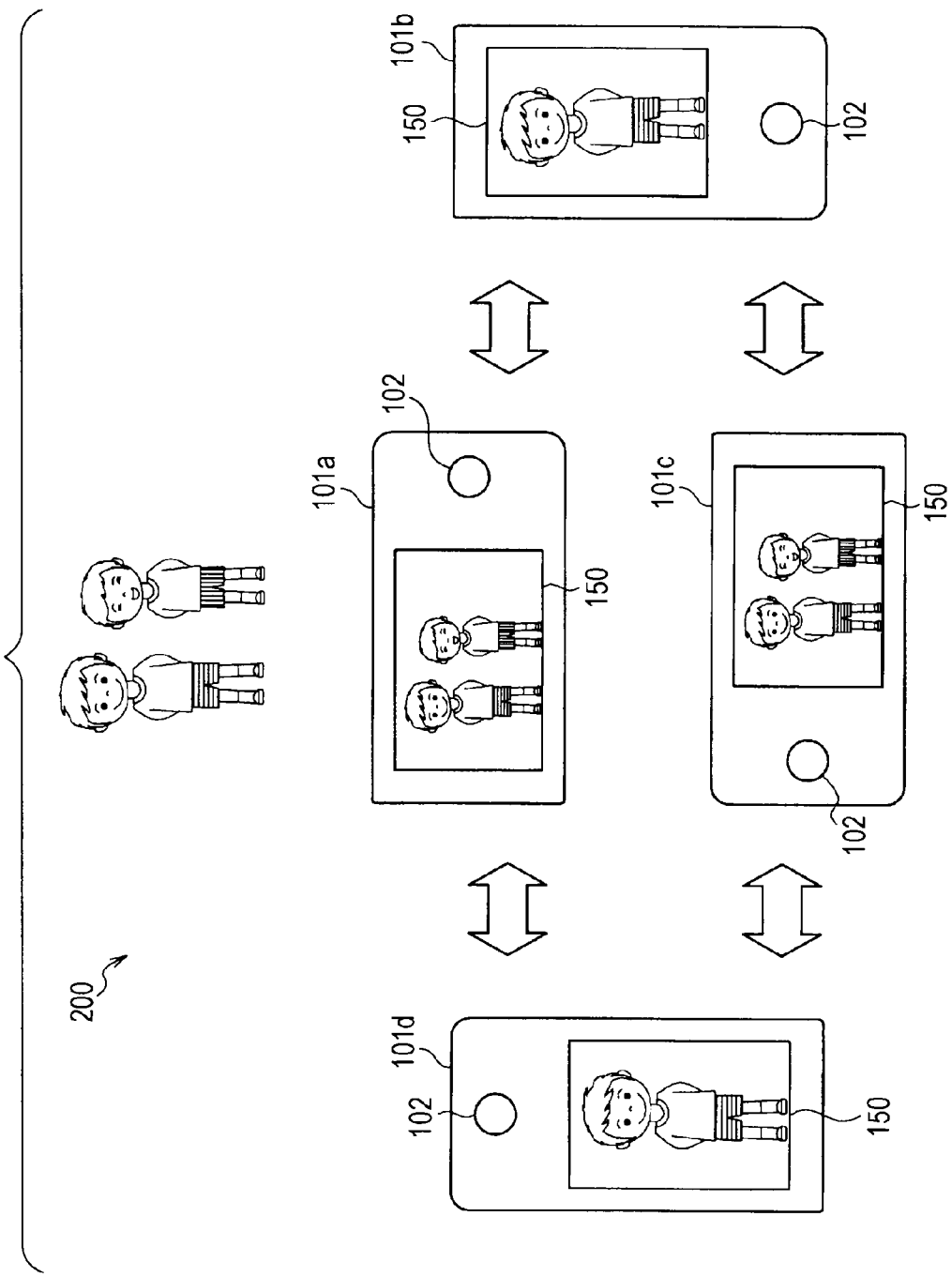
FIG. 4 is a diagram illustrating a change in the posture of a casing of the image processing apparatus according to the first embodiment.
Figure 5:
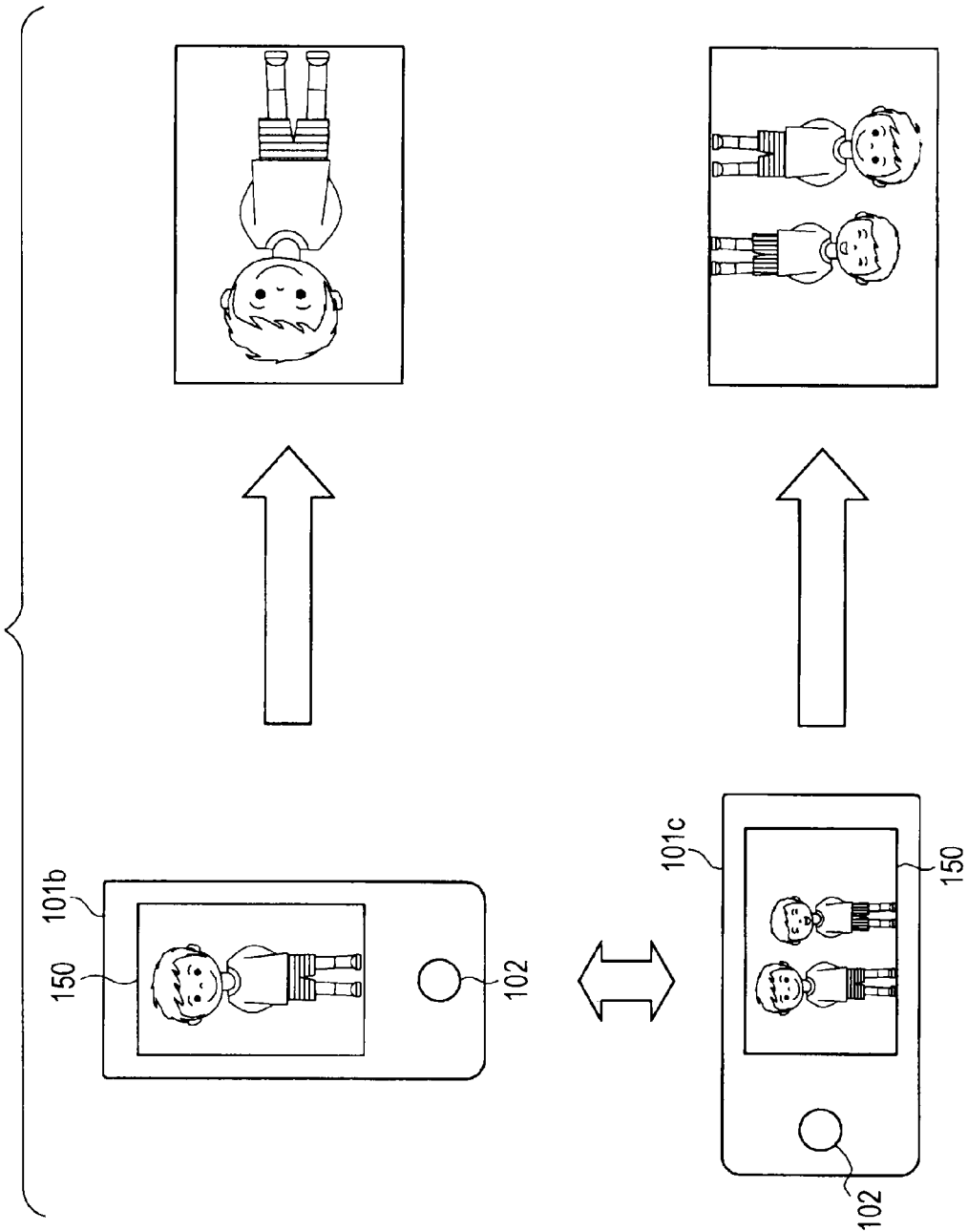
FIG. 5 is a diagram illustrating a change in the posture of the casing of the image processing apparatus according to the first embodiment.

Next, a change in the posture of the casing of the image processing apparatus according to the first embodiment of the disclosure will be described with reference to FIGS. 4 and 5. FIGS. 4 and 5 are diagrams illustrating the change in the posture of the casing 101 of the image processing apparatus 100 according to this embodiment.

In FIG. 4, four kinds of postures of the casing 101 of the image processing apparatus 100 imaging a subject 200 are shown as casings 101*a* to 101*d*. Here, the casing 101 is designed so as to have the primary posture as the posture of the casing 101*a*, as described with reference to FIGS. 1 and 2. For example, however, the posture of the casing 101 may become the postures of the casings 101*b* to 101*d*, when the user rotates the casing 101 depending on various situations such as a case where a vertically long composition is used to image only a boy of the subject 200 or a case where the user operates the casing 101 with his or her left hand.

Hereinafter, the posture of the casing 101 will be described in accordance with two classifications. In the example shown in the drawings, the postures of the casings 101*b* and 101*d* among the postures of the casings 101*a* to 101*d* are assumed to be vertical postures. The postures of the casings 101*c* and 101*d* are referred to as reverse postures. Hereinafter, the vertical postures and the reverse postures will be described. The postures of the casing 101 are defined likewise either as a case where the imaging processing apparatus 100 images a subject or a case where the image processing apparatus 100 reproduces the image data.

First, the vertical postures of the casing 101 will be described. As described with reference to FIGS. 1 and 2, the casing 101 is designed to have a horizontally long shape. That is, the primary posture of the casing 101 is a posture at which the casing 101 is disposed horizontally long. On the other hand, the posture at which the casing 101 is disposed vertically long, as in the casings 101*b* and 101*d*, is a posture reversed horizontally and vertically in comparison to the primary posture of the casing 101. Herein, the postures such as the postures of the casings 101*b* and 101*d* are referred to as the vertical postures. Further, the vertical posture basically refers to the posture reversed horizontally and vertically in comparison to the primary posture of the casing 101 and thus does not necessarily refer to a posture at which the casing 101 is disposed vertically long. For example, when the primary posture of the casing 101 is a posture at which the casing 101 is disposed vertically long, the vertical posture is a posture at which the casing 101 is disposed horizontally long.

Next, the reverse posture of the casing 101 will be described. As described above, the casing 101 is designed such that the display unit 150 is disposed on the left side of the rear surface and the record button 102 is disposed on the right side of the rear surface. That is, when the case 101 is viewed from the rear surface, the primary posture of the casing 101 is a posture at which the display unit 150 is disposed on the left side and the record button 102 is disposed on the right side. On the other hand, when the casing 101 is viewed from the rear surface, as in the posture of the casing 101*c*, the posture at which the display unit 150 is disposed on the right side and the record button 102 is disposed on the left side is a posture at which the upper and lower sides are reversed in comparison to the primary posture of the casing 101. Here, such a posture of the casing 101*c* is referred to as a reverse posture.

Next, a posture different from the reverse posture of the casing 101 will be described. As described above, as the vertical posture of the casing 101, there are two kinds of postures: the posture of the casing 101*b* and the posture of the casing 101*d*. Here, the vertical postures also have to be distinguished from each other in order to distinguish the two kinds of postures. Here, when the casing 101 is viewed from the rear surface, the posture of the casing 101*b*, that is, the posture at which the display unit 150 is disposed on the upper side and the record button 102 is disposed on the lower side is assumed to be a primary vertical posture of the casing 101. On the other hand, when the casing 101 is viewed from the rear surface, the posture of the casing 101*d*, that is, the posture at which the display unit 150 is disposed on the lower side and the record button 102 is disposed on the upper side is assumed to be a reverse vertical posture of the casing 101.

When the posture of the casing 101 is the vertical posture or the reverse posture, the captured image of the subject 200 output from the imaging unit 110 is illustrated in FIG. 5. In the example shown in FIG. 5, the posture of the casing 101*b* is rotated at −90° from the posture of the casing 101*a* which is the primary posture to become the vertical posture. In this case, since the imaging unit 110 is also rotated at −90° with the rotation of the casing 101, the subject 200 is rotated at 90° to fall horizontally in the output captured image. The posture of the casing 101*c* is rotated at 180° from the posture of the casing 101*a*, which is the primary posture, to become the reverse posture. In this case, since the imaging unit 110 is also rotated at 180° with the rotation of the casing 101, the subject 200 is rotated at 180° so that the upper and lower sides of the subject 200 are reversed with respect to one another in the output captured image.

When the image processing apparatus 100 reproduces the image data and the reproduced image output from the recording reproduction unit 123 is output on the display unit 150 without change, although not illustrated in the drawing, the same influence of the posture of the casing 101 occurs. For example, when the image data imaged and recorded at the posture of the casing 101*a* is reproduced at the posture of the casing 101*b*, the subject 200 is rotated at −90° to fall horizontally in the reproduced image displayed on the display unit 150. Further, when the image data imaged and recorded at the posture of the casing 101*a* is reproduced at the posture of the casing 101*c*, the subject 200 is rotated at 180° so that the upper and lower sides of the subject 200 are reversed with respect to one another in the reproduced image displayed on the display unit 150.

1-3. Process at the Imaging Time of Imaging Processing Apparatus

Figure 6:
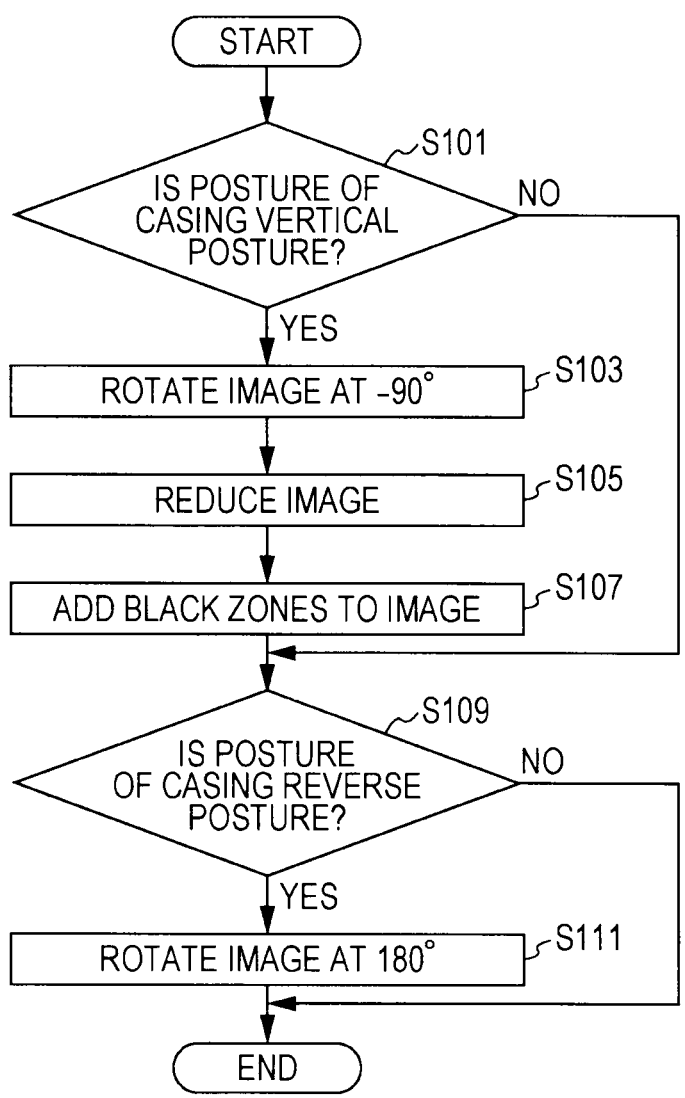
FIG. 6 is a flowchart illustrating a process at the imaging time of the image processing apparatus according to the first embodiment.

Next, a process at the imaging time of the image processing apparatus according to the first embodiment of the disclosure will be described with reference to FIGS. 6 to 8. FIG. 6 is a flowchart illustrating the process at the imaging time of the image processing apparatus 100 according to this embodiment. FIGS. 7 and 8 are diagrams illustrating images recorded or displayed by the imaging processing apparatus 100 as the result of the process shown in FIG. 6.

FIG. 6 is the flowchart illustrating the process in which the control unit 125 of the imaging processing apparatus 100 controls the image transform unit 122 to generate the horizontally and vertically transformed image or the reversed image based on the output from the posture detection unit 140.

In the flowchart shown in FIG. 6, the control unit 125 determines the posture of the casing 101 based on the output from the posture detection unit 140 and subsequently uses this determination, when the recording reproduction unit 123 starts recording the image data. That is, even when the recording reproduction unit 123 continues recording the image data in a moving image capturing mode, the control unit 125 controls the image transform unit 122 based on the posture of the casing 101 obtained when the recording reproduction unit 123 starts recording the image data. For example, when it is supposed that the user intends to change the posture of the casing 101 after the recording of the captured image starts once, this configuration is effective. Otherwise, while the recording reproduction unit 123 records the image data, the control unit 125 may continue determining the posture of the casing 101 based on the output from the posture detection unit 140 and control the image transform unit 122 based on the determined posture.

First, the control unit 125 determines whether the posture of the casing 101 output from the posture detection unit 140 is the vertical posture (step S101). When the posture of the casing 101 is the vertical posture, the control unit 125 controls the image transform unit 122 to transform the captured image output from the imaging unit 110 via the signal processing unit 121 into the horizontally and vertically transformed image. In this case, the image transform unit 122 rotates the image by −90° (step S103). The horizontal and vertical sides of the captured image are reversed with respect to one another by the rotation of −90°. When the posture of the casing 101 is the vertical posture, the horizontal and vertical sides of the captured image are originally reversed with respect to one another. Therefore, the horizontal and vertical sides of the captured image are returned to the original sides by further reversing the horizontal and vertical sides of the captured image.

Next, the image transform unit 122 reduces the image (step S105). In this embodiment, the aspect ratio of the horizontally long screen is determined in advance to the horizontal-to-vertical ratio of 16:9 in the format used for generating the image data. Since the aspect ratio of the image rotated in step S103 is a horizontal-to-vertical ratio of 9:16, the vertical size exceeds a recordable size in accordance with the format. Accordingly, in step S105, the image is reduced so that the vertical size does not exceed the recordable size in accordance with the format.

Next, the image transform unit 122 adds a black zone to the reduced image (step S107). Since as for the image reduced in step S105, the reduced vertically long image is included in the image with the aspect ratio of the horizontally long screen, the right and left sides of the image are opened. Accordingly, the image transform unit 122 inserts black zones to the right and left sides of the image. In the process of step S107, since the opened portions of the image may be buried, a display component, such as a wallpaper image, other than the black zone may be added instead. Through the processes from step S103 to step S107, the horizontally and vertically transformed image with the same size as that of the captured image is generated. Then, the control unit 125 allows the process to proceed to step S109.

On the other hand, when the posture of the casing 101 is not the vertical posture in step S101, the control unit 125 does not transform the captured image into the horizontally and vertically transformed image. Then, the process proceeds to step S109.

Subsequently, the control unit 125 determines whether the posture of the casing 101 output from the posture detection unit 140 is the reverse posture (step S109). When the posture of the casing 101 is the reverse posture, the control unit 125 controls the image transform unit 122 to transform the captured image or the horizontally and vertical transformed image generated through the processes from step S103 to step S107 into the reversed image. In this case, the image transform unit 122 rotates the image by 180° (step S111). The upper and lower sides of the captured image or the horizontally and vertical transformed image are reversed with respect to one another by the rotation of 180°. When the posture of the casing 101 is the reverse posture, the upper and lower sides of the captured image are originally reversed with respect to one another. Therefore, the upper and lower sides of the captured image are returned to the original sides by further reversing the upper and lower sides of the captured image. Then, the control unit 125 ends the process.

On the other hand, when the posture of the casing 101 is not the reverse posture in step S109, the control unit 125 does not transform the captured image or the horizontally and vertically transformed image into the reversed image and ends the process.

When the horizontally and vertically transformed image or the reversed image is generated through the above-described processes, the control unit 125 controls the recording reproduction unit 123 to use the horizontally and vertically transformed image or the reversed image instead of the captured image in the generation of the image data. When the horizontally and vertically transformed image or the reversed image is generated through the above-described processes, the control unit 125 controls the communication unit 160 to transform the horizontally and vertically transformed image or the reversed image into the captured image and output the captured image to an external display apparatus. Further, when the horizontally and vertically transformed image is generated through the above-described processed, the control unit 125 controls the metadata processing unit 124 to add the metadata, which represents that the image is the horizontally and vertically transformed image, to the image data generated as, for example, the tag information included in the file by the recording reproduction unit 123.

On the other hand, even when the horizontally and vertically transformed image or the reversed image is generated through the above-described processes, the captured image output from the imaging unit 110 is displayed on the display unit 150. When the display unit 150 is installed on the casing 101, the display unit 150 is rotated along with the imaging unit 110. Therefore, the horizontal and vertical sides or the upper and lower sides are not reversed in the image displayed on the display unit 150 irrespectively of the posture of the casing 101.

FIG. 7 is a diagram illustrating the horizontally and vertically transformed image generated through the processes described with reference to FIG. 6. When the posture of the casing 101 of the image processing apparatus 100 is the vertical posture, image data 400v recorded by the recording reproduction unit 123 and an external display apparatus 300 displaying the image output from the communication unit 160 are schematically illustrated in FIG. 7.

In the example shown in the drawing, the posture of the casing 101b is rotated at −90° from the primary posture to become the vertical posture. In this case, the control unit 125 controls the image transform unit 122 to transform the captured image output from the imaging unit 110 into the horizontally and vertically transformed image through the processes described with reference to FIG. 6. Further, the control unit 125 controls the recording reproduction unit 123 to generate and record the image data from the horizontally and vertically transformed image. Furthermore, the control unit 125 controls the communication unit 160 to output the horizontally and vertically transformed image to the external display apparatus 300. As a consequence, based on the image data 400v recorded by the recording reproduction unit 123, the image captured at the vertical posture is displayed as a vertically long image. Since the recorded image itself is horizontally long, the vertical size of the captured image is reduced so as not to exceed the size of the recorded image, so that the black zones are displayed on both sides of the image. The image captured at the vertical posture is displayed as a vertically long image even on the display apparatus 300 that displays the image output from the communication unit 160 in the same manner.

FIG. 8 is a diagram illustrating the reversed image generated through the processes described with reference to FIG. 6. In FIG. 8, when the posture of the casing 101 of the image processing apparatus 100 is the reverse posture, image data 400r recorded by the recording reproduction unit 123 and the external display apparatus 300 displaying the image output from the communication unit 160 are schematically illustrated.

In the example shown in the drawing, the posture of the casing 101c is rotated at 180° from the primary posture to become the reverse posture. In this case, the control unit 125 controls the image transform unit 122 to transform the captured image output from the imaging unit 110 into the reversed image through the processes described with reference to FIG. 6. Further, the control unit 125 controls the recording reproduction unit 123 to generate and record the image data from the reversed image. Furthermore, the control unit 125 controls the communication unit 160 to output the reversed image to the external display apparatus 300. As a consequence, based on the image data 400r recorded by the recording reproduction unit 123, the image captured at the reverse posture is displayed as an image with the regular upper and lower sides. Since the captured image itself is horizontally long, the size is not changed. The image captured at the reverse posture is likewise displayed as the image with the regular upper and lower sides even on the display apparatus 300 that displays the image output from the communication unit 160.

1-4. Process at the Reproducing Time of Imaging Processing Apparatus

Figure 9:
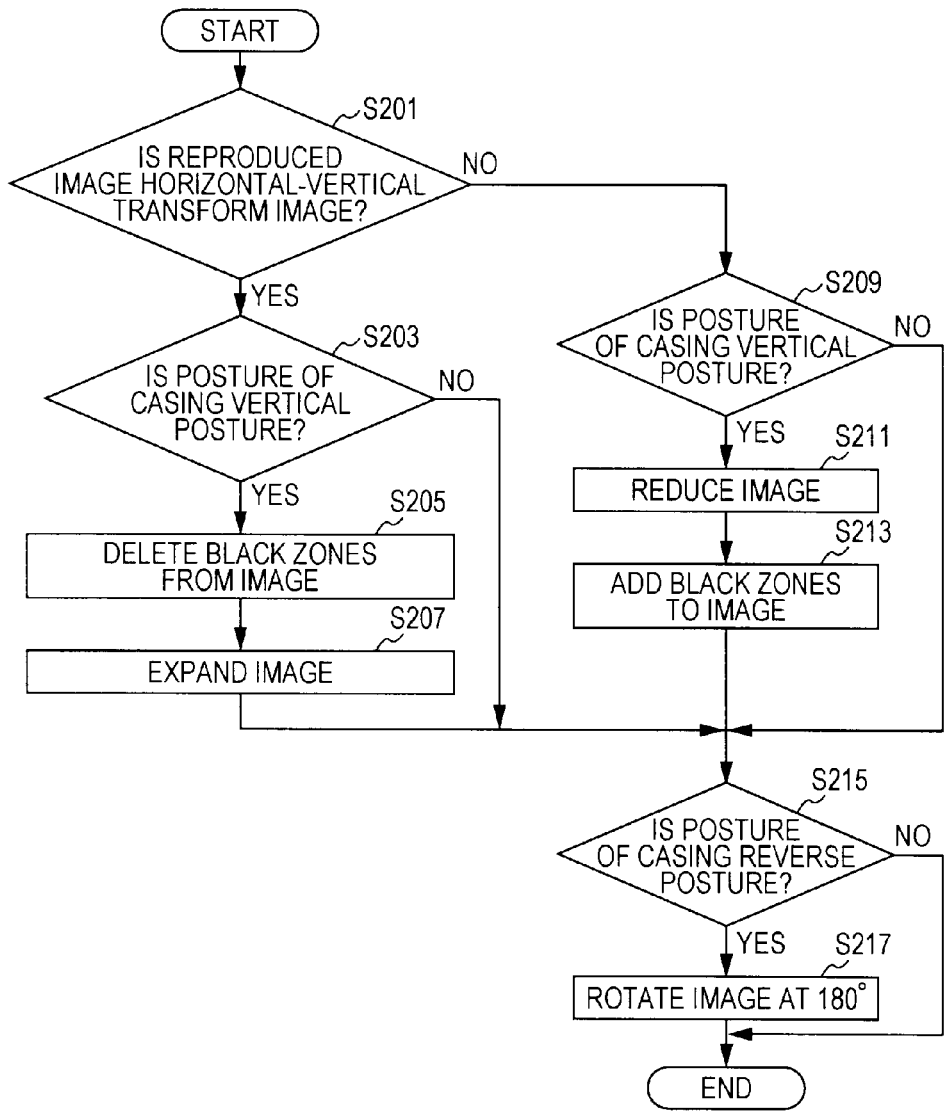
FIG. 9 is a flowchart illustrating a process at the reproducing time of the image processing apparatus according to the first embodiment.
Figure 11:
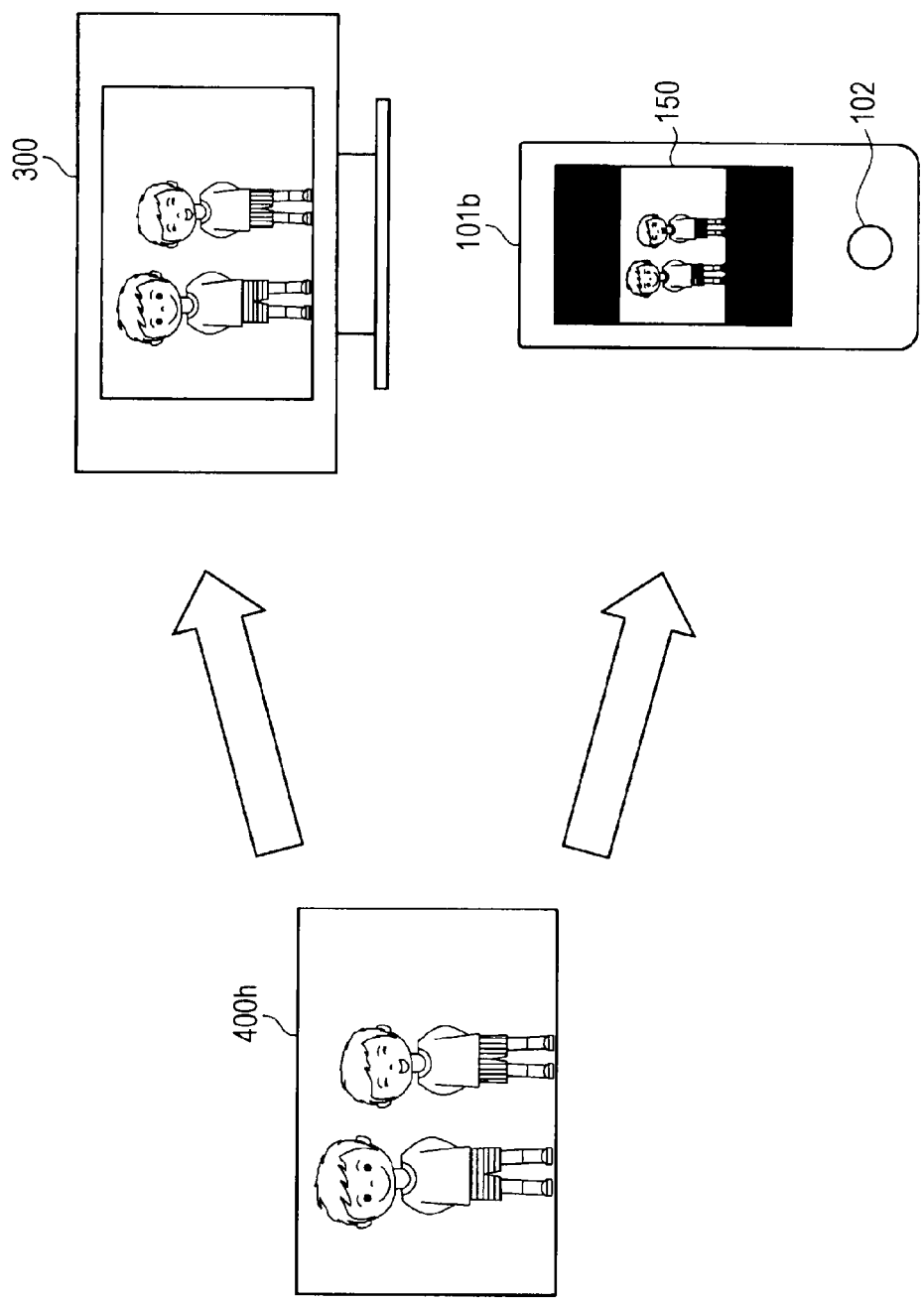
FIG. 11 is a diagram illustrating an image displayed by the image processing apparatus according to the first embodiment.

Next, the process at the reproducing time of the image processing apparatus according to the first embodiment of the disclosure will be described with reference to FIGS. 9 to 11. FIG. 9 is a flowchart illustrating the process at the reproducing time of the image processing apparatus 100 according to this embodiment. FIGS. 10 and 11 are diagrams illustrating images displayed by the image processing apparatus 100 as the result of the process shown in FIG. 9.

FIG. 9 is the flowchart illustrating the process in which the control unit 125 of the imaging processing apparatus 100 controls the image transform unit 122 to generate the expanded or reduced image or the reversed image based on the outputs from the metadata processing unit 124 and the posture detection unit 140. In the flowchart shown in FIG. 9, the control unit 125 continues determining the posture of the casing 101 based on the output from the posture detection unit 140 during the reproduction of the image data by the recording reproduction unit 123 and controls the image transform unit 122 based on the determined posture. For example, when it is supposed that the user changes the posture of the casing 101 in order to easily view the image even after the reproduction of the image data starts once, this configuration is effective. Otherwise, when the recording reproduction unit 123 starts reproducing the image data, the control unit 125 may determine the posture of the casing 101 based on the output from the posture determination unit 140 and subsequently may the use this determination.

First, the control unit 125 determines whether the reproduced image is the horizontally and vertically transformed image based on the metadata acquired from the image data to be reproduced by the metadata processing unit 124 (step S201). When the reproduced image is the horizontally and vertically transformed image, the control unit 125 determines whether the posture of the casing 101 output from the posture determination unit 140 is the vertical posture (step S203).

When the posture of the casing 101 is the vertical posture, the control unit 125 controls the image transform unit 122 to transform the reproduced image acquired from the image data by the recording reproduction unit 123 into the expanded or reduced image. In this case, the image transform unit 122 first deletes the black zones inserted into the both right and left sides of the horizontally and vertically transformed image (step S205). Next, the image transform unit 122 expands the image from which the black zones are deleted so as to have a size corresponding to the size of the display unit 150 (step S207). Then, the control unit 125 allows the process to proceed to step S215.

When the posture of the casing 101 is not the vertical posture in step S203, the control unit 125 does not transform the reproduced image into the expanded or reduced image. Then, the process proceeds to step S215.

On the other hand, when the control unit 125 determines that the reproduced image is not the horizontally and vertically transformed image in step S201, the control unit 125 determines whether the posture of the casing 101 output from the posture detection unit 140 is the vertical posture (step S209).

When the posture of the casing 101 is the vertical posture, the control unit 125 controls the image transform unit 122 to transform the reproduced image into the expanded or reduced image. In this case, the image transform unit 122 first reduces the reproduced image so as not to exceed the size which can be displayed by the display unit 150 (step S211). Next, the image transform unit 122 adds the black zones to the reduced image (step S213). Since as for the image reduced in step S211, the reduced horizontally long image is displayed on the display unit 150 disposed vertically long, the upper and lower sides of the image are opened. Thus, the image transform unit 122 inserts the black zones into the both upper and lower sides of the image. In the process of step S213, since the opened portions of the image may be buried, a display component, such as a wallpaper or the like image, other than the black zone may be added instead. Then, the control unit 125 allows the process to proceed to step S215.

On the other hand, when the posture of the casing 101 is not the vertical posture in step S209, the control unit 125 does not transform the reproduced image into the expanded or reduced image. Then, the process proceeds to step S215.

Subsequently, the control unit 125 determines whether the posture of the casing 101 output from the posture detection unit 140 is the reverse posture (step S215). When the posture of the casing 101 is the reverse posture, the control unit 125 controls the image transform unit 122 to transform the reproduced image or the expanded or reduced image generated through the processes of step S205 and step S207 or the processes of step S211 to step S213 into the reversed image. In this case, the image transform unit 122 rotates the image by 180° (step S217). The upper and lower sides of the reproduced image or the expanded or reduced image are reversed with respect to one another by the rotation of 180°. When the reproduced image or the expanded or reduced image is displayed on the display unit 150 without transform in the case where the posture of the casing 101 is the reverse posture, the upper and lower sides of the captured image are reversed with respect to one another. Therefore, the reproduced image of the regular upper and lower sides is displayed on the display unit 150 by reversing the upper and lower sides of the reproduced image or the expanded or reduced image one another. Then, the control unit 125 ends the process.

On the other hand, when the posture of the casing 101 is not the reverse posture in step S215, the control unit 125 does not transform the reduced image or the expanded or reduced image into the reversed image and ends the process.

When the expanded or reduced image or the reversed image is generated through the above-described processes, the control unit 125 controls the display unit 150 to display the expanded or reduced image or the reversed image instead of the reproduced image. On the other hand, even when the expanded or reduced image or the reversed image is generated through the above-described processes, the communication unit 160 outputs the reproduced image acquired by the recording reproduction unit 123. The external display apparatus 300 displaying the image output from the communication unit 160 has a fixed posture irrespective of the posture of the casing 101 of the image processing apparatus 100. Accordingly, the horizontal and vertical sides or the upper and lower sides of the image are not reversed between the reproduced image and the image displayed on the external display apparatus 300 irrespective of the posture of the casing 101.

FIG. 10 is a diagram illustrating an expanded image between the expanded and reduced images generated through the processes described with reference to FIG. 9. When the posture of the casing 101 of the image processing apparatus 100 is the vertical posture, an image to be displayed on the display unit 150 of the image processing apparatus 100 and the external display apparatus 300 by the image data 400v, which is the horizontally and vertically transformed image, is schematically illustrated in FIG. 10.

In the example shown in the drawing, the posture of the casing 101b is rotated at −90° from the primary posture and becomes the vertical posture. In this case, the control unit 125 controls the image transform unit 122 to transform the reproduced image acquired from the image data 400v, which is the horizontally and vertically transformed image, through the processes described with reference to step S205 and step S207 of FIG. 9 by the recording reproduction unit 123, into the expanded or reduced image. Further, the control unit 125 controls the display unit 150 to display the expanded or reduced image instead of the reproduced image. As a consequence, the image displayed on the display unit 150 becomes an image obtained by expanding a portion from which the black zones is removed from the image data 400v so as to have a size corresponding to the size of the display unit 150 disposed vertically long.

That is, when the posture of the casing 101 is the vertical posture and thus the aspect ratio of the screen of the display unit 150 is vertically long, the image captured at the aspect ratio of the vertically long screen is expanded to the size at the imaging time from the size reduced in the horizontally and vertically transformed image and is displayed on the display unit 150. On the other hand, the reproduced image acquired from the image data 400v by the recording reproduction unit 123 and having the aspect ratio of the horizontally long screen is displayed on the external display apparatus 300 with the aspect ratio of the horizontally long screen irrespective of the posture of the casing 101.

FIG. 11 is a diagram illustrating a reduced image between the expanded and reduced images generated through the processes described with reference to FIG. 9. When the posture of the casing 101 of the image processing apparatus 100 is the vertical posture, an image to be displayed on the display unit 150 of the image processing apparatus 100 and the external display apparatus 300 by an image data 400h, which is not the horizontally and vertically transformed image, is schematically illustrated in FIG. 11.

In the example shown in the drawing, the posture of the casing 101b is rotated at −90° from the primary posture and becomes the vertical posture. In this case, the control unit 125 controls the image transform unit 122 to transform the reproduced image acquired from the image data 400h through the processes described with reference to step S211 and step S213 of FIG. 9 by the recording reproduction unit 123, into the expanded or reduced image. Further, the control unit 125 controls the display unit 150 to display the expanded or reduced image instead of the reproduced image. As a consequence, the image displayed on the display unit 150 becomes an image obtained by adding the black zones to the upper and lower sides of the image reduced so that the image data 400h corresponds to the horizontal size of the display unit 150.

That is, when the posture of the casing 101 is the vertical posture and thus the aspect ratio of the screen of the display unit 150 is vertically long, the image captured at the aspect ratio of the horizontally long screen is reduced so as to have a horizontal size which can be displayed on the display unit 150 and is displayed on the display unit 150. On the other hand, the reproduced image acquired from the image data 400v by the recording reproduction unit 123 and having the aspect ratio of the horizontally long screen is displayed on the external display apparatus 300 with the aspect ratio of the horizontally long screen irrespective of the posture of the casing 101.

2. Review

According to an embodiment of the disclosure, the image processing apparatus 100 includes: the casing 101; the posture detection unit 140 detecting whether the posture of the casing 101 is the vertical posture; the imaging unit 110 capturing the image of the subject 200 and outputting the captured image; the image transform unit 122 transforming the captured image into the horizontally and vertically transformed image with the same size as that of the captured image by rotating the captured image so as to reverse its horizontal and vertical sides and further reducing the captured image; the recording reproduction unit 123 recording the image data generated from the captured image; and the control unit 125 controlling the image transform unit 122 and the recording reproduction unit 123 to generate the image data from the horizontally and vertically transformed image instead of the captured image, when the posture of the casing 101 is the vertical posture. With such a configuration, even when the posture of the image processing apparatus is the vertical posture reversed horizontally and vertically with respect to the primary posture of the image processing apparatus at the imaging time, the recorded image does not fall horizontally and the image can be recorded in the regular direction of the subject 200. Even when the recorded image is reproduced by an apparatus other than the image processing apparatus 100 according to the embodiment of the disclosure, the recorded image is reproduced as the image of the subject 200 in the regular direction without a separate process.

The image processing apparatus 100 may further include the display unit 150 displaying the captured image irrespective of the posture of the casing 101. When the display unit 150 is provided with the casing 101 together with the imaging unit 110, both the display unit 150 and the imaging unit 110 follows the change in the posture of the casing 101. Accordingly, with such a configuration, the image of the subject 200 in the regular direction can be displayed on the display unit 150.

The image processing apparatus 100 may further include the communication unit 160 outputting the captured image to the external display apparatus 300. The control unit 125 may control the image transform unit 122 and the communication unit 160 to output the horizontally and vertically transformed image instead of the captured image, when the posture of the casing 101 is the vertical posture. When the captured image is output to the external display apparatus 300, the posture of the casing 101 has no influence on the posture of the external display apparatus 300. Accordingly, with such a configuration, the captured image of the subject 200 in the regular direction can be displayed on the external display apparatus 300 without performing a separate process.

The image processing apparatus 100 may further include the metadata processing unit 124 adding the metadata, which indicates whether an image included in the image data is the horizontally and vertically transformed image, to the image data. With such a configuration, when the image is reproduced from the image data, it can be recognized whether the image included in the image data is the horizontally and vertically transformed image. Thus, when the horizontally and vertically transformed image is reproduced and displayed on the vertically long display unit 150, the image can be expanded so as to have a size corresponding to the size of the display unit 150. The vertically long display unit is not limited to the display unit 150, but may be a display unit of an apparatus other than the image processing apparatus 100.

The control unit 125 may determine whether the posture of the casing 101 is the vertical posture, when the recording reproduction unit 123 starts recording the image data. When the change in the posture of the casing 101 is considered to be a user's intentional change in the posture after the imaging starts once, the change in the direction of the image at the time when the user intends to rotate the casing 101 can be configured not to be corrected by such a configuration.

The posture detection unit 140 detects whether the posture of the casing 101 is a reverse posture. The image transform unit 122 may transform the captured image or the horizontally and vertically transformed image into the reversed image by rotating the captured image or the horizontally and vertically transformed image so as to reverse its upper and lower sides. The control unit 125 controls the image transform unit 122 and the recording reproduction unit 123 to generate the image data from the reversed image instead of the captured image or the horizontally and vertically transformed image, when the posture of the casing 101 is the reverse posture. With such a configuration, even when the posture of the image processing apparatus is the posture reversed in the upper and lower sides with respect to the primary posture of the image processing apparatus at the imaging time, the image of the subject 200 in the regular direction can be recorded without reversing the upper and lower sides of the recorded image. For example, even when the recorded image is reproduced by an apparatus other than the image processing apparatus 100 according to the embodiment of the disclosure, the recorded image is reproduced as the image of the subject 200 in the regular direction without a separate process.

The image processing apparatus 100 may further include the display unit 150 displaying a reproduced image. The recording reproduction unit 123 may acquire the reproduced image from the image data. The metadata processing unit 124 may acquire the metadata added to the image data. Based on the metadata, the image transform unit 122 may transform the reproduced image into the expanded or reduced image by expanding or reducing the reproduced image so as to have a size corresponding to the size of the display unit 150. The control unit 125 may control the image transform unit 122 and the display unit 150 to display the expanded or reduced image instead of the reproduced image, when the posture of the casing 101 is the vertical posture. With such a configuration, when the posture of the casing 101 is the vertical posture, the horizontally and vertically transformed image that is reduced at the imaging time and is vertically long can be expanded and the image of the subject 200 in the regular direction can be reproduced with the size corresponding to the size of the display unit 150. Further, when the posture of the casing 101 is the vertical posture, the horizontally long reproduced image can be reduced and the image of the subject 200 in the regular direction can be reproduced so as to have the size corresponding to the size of the display unit 150.

According to another embodiment of the disclosure, the image processing apparatus 100 includes: the casing 101; the posture detection unit 140 detecting whether the posture of the casing 101 is the vertical posture; the recording reproduction unit 123 acquiring the reproduced image from the image data; the display unit 150 displaying the reproduced image; the metadata processing unit 124 acquiring the metadata indicating whether the image added to the image data and included in the image data is the horizontally and vertically transformed image; the image transform unit 122 transforming the reproduced image into the expanded or reduced image by expanding or reducing the reproduced image so as to have a size corresponding to the size of the display unit 150 based on the metadata; and the control unit 125 controlling the image transform unit 122 and the display unit 150 to display the expanded or reduced image instead of the reproduced image, when the posture of the casing 101 is the vertical posture. With such a configuration, even when the posture of the casing 101 is the vertical posture, the horizontally and vertically transformed image that is reduced at the imaging time and is vertically long can be expanded and the image of the subject 200 in the regular direction can be reproduced with the size corresponding to the size of the display unit 150. Further, when the posture of the casing 101 is the vertical posture, the horizontally long reproduced image can be reduced and the image of the subject 200 in the regular direction can be reproduced so as to have a size corresponding to the size of the display unit 150.

The image processing apparatus 100 may further include the communication unit 160 outputting the reproduced image to the external display apparatus 300 irrespective of the posture of the casing 101. When the reproduced image is output to the external display apparatus 300, the posture of the casing 101 has no influence on the posture of the external display apparatus 300. Therefore, with such a configuration, the reproduced image of the subject 200 in the regular direction can be displayed on the external display apparatus 300.

The posture detection unit 140 may detect whether the posture of the casing 101 is the reverse posture. The image transform unit 122 may transform the reproduced image or the expanded or reduced image into the reversed image by rotating the reproduced image or the expanded or reduced image so as to reverse its upper and lower sides. The control unit 125 controls the image transform unit 122 and the display unit 150 to display the reversed image instead of the reproduced image or the expanded or reduced image, when the posture of the casing 101 is the reverse posture. With such a configuration, even when the posture of the image processing apparatus is the posture reversed in the upper and lower sides with respect to the primary posture of the image processing apparatus at the imaging time, the image of the subject 200 in the regular direction can be reproduced without reversing the upper and lower sides of the recorded image.

The preferred embodiments of the disclosure have hitherto been described in detail with reference to the accompanying drawings, but embodiments of the disclosure are not limited thereto. It is apparent to those skilled in the art that various modifications or alternations can be made within the scope of the technical gist described in the appended claims and the modifications or alternations are, of course, within the technical scope of the disclosure.

For example, in the above-described embodiment, the image data at the imaging time is stored in the storage unit of the image processing apparatus, but the embodiment of the disclosure is not limited thereto. For example, the image data at the imaging time may be stored in an external storage apparatus outside the image processing apparatus via the communication unit.

In the above-described embodiment, the image data at the reproducing time is read from the storage unit of the image processing apparatus, but the embodiment of the disclosure is not limited thereto. For example, the image data at the reproducing time may be read from an external storage apparatus outside the image processing apparatus via the communication unit.

In the above-described embodiment, the information regarding whether the image is the horizontally and vertically transformed image is maintained by the metadata added to the image data, but the embodiment of the disclosure is not limited thereto. For example, the information regarding the image data stored in the storage unit may be maintained by a property file separately created in the storage unit.

The present disclosure contains subject matter related to that disclosed in Japanese Priority Patent Application JP 2010-194107 filed in the Japan Patent Office on Aug. 31, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   a casing; and
   circuitry configured to
   detect whether a posture of the casing is a vertical posture,
   capture an image of a subject and output the captured image,
   transform the captured image into a horizontally and vertically transformed image with a same size as that of the captured image by rotating the captured image so as to reverse its horizontal and vertical sides and by reducing the captured image, and by adding black zones to the horizontally and vertically transformed image after reduction,
   record the captured image after transformation, and
   generate the image data from the horizontally and vertically transformed image instead of the captured image, when the posture of the casing is the vertical posture, wherein the circuitry detects whether the posture of the casing is a reverse posture and rotates by 180 degrees the image data of one of the captured image and horizontally and vertically transformed image, when the posture of the casing is the reverse posture, and the circuitry is further configured to output the captured image to an external display apparatus, and output the horizontally and vertically transformed image instead of the captured image, when the posture of the casing is the vertical posture.

2. The image processing apparatus according to claim 1, wherein the circuitry is further configured to display the captured image irrespective of the posture of the casing.

3. The image processing apparatus according to claim 1, wherein the circuitry is further configured to add metadata, which indicates whether an image included in the image data is the horizontally and vertically transformed image, to the image data.

4. The image processing apparatus according to claim 1, wherein the circuitry determines whether the posture of the casing is the vertical posture, when the circuitry starts recording the image data.

5. The image processing apparatus according to claim 1, wherein the circuitry is further configured to display a reproduced image,
    acquire the reproduced image from the image data,
    acquire the metadata added to the image data,
    wherein based on the metadata, the circuitry transforms the reproduced image into an expanded or reduced image by expanding or reducing the reproduced image so as to have a size corresponding to the size of the display, and
    the circuitry displays the expanded or reduced image instead of the reproduced image, when the posture of the casing is the vertical posture.

6. The image processing apparatus according to claim 1, wherein the reverse posture is one of a reversed vertical posture and a reversed horizontal posture.

7. An image processing apparatus comprising:
    a casing; and
    circuitry configured to
        detect whether a posture of the casing is a vertical posture;
        acquire a reproduced image from image data;
        display the reproduced image;
        acquire metadata indicating whether an image added to the image data and included in the image data is a horizontally and vertically transformed image;
        transform the reproduced image into an expanded or reduced image by expanding or reducing the reproduced image so as to have a size corresponding to the size of the display based on the metadata, the circuitry adding black zones to a reduced reproduced image; and
        display the expanded or reduced image instead of the reproduced image, when the posture of the casing is the vertical posture,
    wherein the circuitry detects whether the posture of the casing is a reverse posture and rotates by 180 degrees the image data of one of the reproduced image and horizontally and vertically transformed image, when the posture of the casing is the reverse posture, and
    the circuitry is further configured to output the reproduced image to an external display apparatus, and output the horizontally and vertically transformed image instead of the captured image, when the posture of the casing is the vertical posture.

8. The image processing apparatus according to claim 7, wherein the circuitry detects whether the posture of the casing is a reverse posture,
    transforms the reproduced image or the expanded or reduced image into a reversed image by rotating the reproduced image or the expanded or reduced image so as to reverse the upper and lower sides thereof, and
    displays the reversed image instead of the reproduced image or the expanded or reduced image, when the posture of the casing is the reverse posture.

9. An image processing method comprising:
    detecting whether a posture of a casing is a vertical posture or a reverse posture;
    capturing an image of a subject and outputting the captured image;
    transforming the captured image into a horizontally and vertically transformed image with the same size as that of the captured image by rotating the captured image so as to reverse the horizontal and vertical sides thereof, by reducing the captured image, and by adding black zones to the captured image after reduction; and
    recording the captured image after transformation,
    wherein the image data is generated from the horizontally and vertically transformed image instead of the captured image, when the posture of the casing is the vertical posture,
    the image data of one of the captured image and horizontally and vertically transformed image is rotated by 180 degrees, when the posture of the casing is the reverse posture, and
    the captured image is outputted to an external display apparatus, and the horizontally and vertically transformed image is outputted instead of the captured image, when the posture of the casing is the vertical posture.

10. An image processing method comprising:
    detecting whether a posture of a casing is a vertical posture or a reversed posture;
    acquiring a reproduced image from image data;
    displaying the reproduced image on a display;
    acquiring metadata indicating whether an image added to the image data and included in the image data is a horizontally and vertically transformed image; and
    transforming the reproduced image into an expanded or reduced image by expanding or reducing the reproduced image so as to have a size corresponding to the size of the display based on the metadata, black zones being added to the reproduced image when the reproduced image is reduced,
    wherein the expanded or reduced image is displayed instead of the reproduced image, when the posture of the casing is the vertical posture,
    the image data of one of the reproduced image and horizontally and vertically transformed image is rotated by 180 degrees, when the posture of the casing is the reverse posture, and
    the reproduced image is outputted to an external display apparatus, and the horizontally and vertically transformed image is outputted instead of the captured image, when the posture of the casing is the vertical posture.

* * * * *